US012668411B2

(12) United States Patent　　　(10) Patent No.:　US 12,668,411 B2

Lauro　　　　　　　　　　　　　　(45) Date of Patent:　Jun. 30, 2026

(54) DRY ICE BOX

(71) Applicant: Christopher J. Lauro, Northport, NY (US)

(72) Inventor: Christopher J. Lauro, Northport, NY (US)

(73) Assignee: Christopher J. Lauro, Northport, NY (US)

( * ) Notice: Subject to any disclaimer, the term of this patent is extended or adjusted under 35 U.S.C. 154(b) by 0 days.

(21) Appl. No.: 18/397,348

(22) Filed: Dec. 27, 2023

(65) Prior Publication Data

US 2025/0214761 A1　　　Jul. 3, 2025

(51) Int. Cl.
　　*B65D 81/38*　　　(2006.01)
　　*B23K 26/24*　　　(2014.01)
　　*B65D 51/28*　　　(2006.01)
　　*B65D 65/42*　　　(2006.01)
　　*B65D 81/02*　　　(2006.01)

(52) U.S. Cl.
　　CPC .......... *B65D 81/3823* (2013.01); *B23K 26/24* (2013.01); *B65D 51/28* (2013.01); *B65D 65/42* (2013.01); *B65D 65/44* (2013.01); *B65D 81/3816* (2013.01); *B65D 81/3818* (2013.01); *B65D 81/3825* (2013.01)

(58) Field of Classification Search
　　CPC .................... B65D 81/3827; B65D 81/3823
　　See application file for complete search history.

(56) References Cited

U.S. PATENT DOCUMENTS

| | | | |
|---|---|---|---|
| 6,037,033 A | 3/2000 | Hunter | |
| 9,051,014 B2 | 6/2015 | Lookebill et al. | |
| 9,272,475 B2 | 3/2016 | Ranade et al. | |
| 9,688,454 B2 * | 6/2017 | Ranade ................. | B32B 27/306 |
| 9,689,604 B2 | 6/2017 | Wu | |
| 11,059,651 B2 * | 7/2021 | Knight .............. | B65D 81/3816 |
| 11,554,907 B2 | 1/2023 | Wooldridge et al. | |
| 2012/0031957 A1 | 2/2012 | Whitaker | |
| 2018/0328644 A1 | 11/2018 | Rizzo et al. | |

(Continued)

FOREIGN PATENT DOCUMENTS

| | | | | |
|---|---|---|---|---|
| CN | 205706363 U | | 11/2016 | |
| CN | 107042936 A | * | 8/2017 | ............. B65D 25/14 |
| CN | 107128567 A | * | 9/2017 | |

(Continued)

OTHER PUBLICATIONS

CN_107128567_A_I_translation.pdf (Year: 2025).*
CN_107042936_A_I_translation.pdf (Year: 2025).*
CN_115895117_A_I_translation.pdf (Year: 2025).*

*Primary Examiner* — Allan D Stevens

(74) *Attorney, Agent, or Firm* — Sorell, Lenna & Schmidt, LLP

(57) ABSTRACT

A thermocarrier box includes an outer shell and insulated panels coupled to a bottom wall of the outer shell and to side walls of the outer shell. The thermocarrier box includes an inner box positioned within the outer shell such that a bottom wall of the inner box and side walls of the inner box are each coupled to one of the insulated panels. Another insulated panel is positioned over the inner box. A lid is positioned over the another insulated panel such that the another insulated panel is positioned between the lid and the inner box. Methods of assembly are provided.

15 Claims, 11 Drawing Sheets

(56) References Cited

U.S. PATENT DOCUMENTS

2019/0030661 A1 * 1/2019 Hollingsworth ........ B23P 15/26
2021/0309442 A1 * 10/2021 Kletzel ............. B65D 21/0213

FOREIGN PATENT DOCUMENTS

| CN | 107323878 | A | * | 11/2017 | | |
|----|-----------|---|---|---------|---|---|
| CN | 218288489 | U | | 1/2023 | | |
| CN | 115895117 | A | * | 4/2023 | | |
| FR | 2847237 | A1 | * | 5/2004 | ............... | F25D 3/08 |

* cited by examiner

DRY ICE BOX

TECHNICAL FIELD

The present disclosure generally relates to containers, and more particularly to containers that are adapted to maintain a minimum temperature within the containers for storing and/or shipping temperature-sensitive items.

BACKGROUND

Various containers have been developed to store and/or ship temperature-sensitive items, such as, for example, biological samples, pharmaceuticals, foods, etc., that must be stored above a minimum threshold temperature to avoid degradation, decomposition, spoilage, or other damage to the item. Some containers have been developed that are insulated such that ice and/or another cooling agent that is inserted into the container can maintain the temperature within the container at a suitable level for temperature-sensitive items. However, such insulated containers are only capable of maintaining the temperature within the container at a suitable level for temperature-sensitive items for a very short period of time (e.g., a few hours). Indeed, due to ice melting, leaks in the container, etc., the temperature inside of the container will increase over time. As the temperature inside of the container increases, the temperature inside of the container will eventually exceed the minimum threshold temperature required to avoid degradation, decomposition, spoilage, or other damage to the item. At that time, the container becomes unsuitable for storing the temperature-sensitive item. Due to the short amount of time that insulated containers are capable of maintaining the temperature within the container at a suitable level for temperature-sensitive items, such insulated containers are typically unacceptable for storing and/or shipping temperature-sensitive items for more than a few hours.

To increase the amount of time that containers are capable of maintaining the temperature within the container at a suitable level for temperature-sensitive items, some container manufacturers have incorporated various materials into their containers. For example, some container manufacturers have incorporated vacuum insulated panels (VIPs) into their containers that can be used with or without additional cooling agents (ice, dry ice, etc.) to maintain the temperature within the container at a suitable level for temperature-sensitive items. However, even with the addition of VIPs to the containers, the containers are still only capable of maintaining the temperature within the container at a suitable level for temperature-sensitive items for slightly longer than insulated containers that lack VIPs. Indeed, while the addition of VIPs to an insulated container may increase the duration that the container can maintain the temperature within the container at a suitable level for temperature-sensitive items by a few hours, this additional time is insufficient for items that are stored for longer periods of time and/or require more time to be shipped to their destination.

Accordingly, there is an established need for a container that can maintain the temperature within the container at a suitable level for temperature-sensitive items for periods of time sufficient to allow the items to be shipped to their destination. This disclosure describes an improvement over these prior art technologies.

SUMMARY

In one embodiment, in accordance with the principles of the present disclosure, a thermocarrier box comprises an outer shell having a bottom wall and four side walls each extending from the bottom wall. A first vacuum insulated panel is coupled to the bottom wall. A second vacuum insulated panel is coupled to each one of the side walls. An inner box comprises a bottom wall and four side walls each extending from the bottom wall of the inner box. The bottom wall of the inner box and the side walls of the inner box are each made from a first material. Outer surfaces of the bottom wall of the inner box and the side walls of the inner box are each coated with a second material. The inner box is positioned within the outer shell such that the bottom wall of the inner box is coupled to the first vacuum insulated panel and the side walls of the inner box are each coupled to one of the second vacuum insulated panels. A third vacuum insulated panel is positioned over the inner box such that the third vacuum insulated panel engages the side walls of the inner box. A lid is positioned over the third vacuum insulated panel such that the third vacuum insulated panel is positioned between the lid and the inner box.

In one embodiment, in accordance with the principles of the present disclosure, a method of assembling a thermocarrier box comprises: providing an inner box comprising a bottom wall and four side walls each extending from the bottom wall of the inner box, the bottom wall of the inner box and the side walls of the inner box each being made from a first material; coating outer surfaces of the bottom wall and the side walls with a second material; coupling a first vacuum insulated panel to the bottom wall; coupling a second vacuum insulated panel to each one of the side walls; positioning an outer shell over the inner box and the vacuum insulated panels, the outer shell comprising a bottom wall and four side walls each extending from the bottom wall of the outer shell, the first vacuum insulated panel being positioned between the bottom walls, the second vacuum insulated panels each being positioned between one of the side walls of the outer shell and one of the side walls of the inner box; positioning a third vacuum insulated panel over the inner box such that the third vacuum insulated panel engages the side walls of the inner box; and positioning a lid over the third vacuum insulated panel such that the third vacuum insulated panel is positioned between the lid and the inner box.

In some embodiments, the first material is stainless steel and the second material is a thermal paint. In some embodiments, coating the outer surfaces of the bottom wall and the side walls with the second material comprises coating the outer surfaces of the bottom wall and the side walls with a first layer of the second material and a second layer of the second material. In some embodiments, the first layers each directly engage the outer surfaces of the bottom wall of the inner box and the side walls of the inner box and are thicker than the second layers.

In some embodiments, providing the inner box comprises laser welding the side walls of the inner box to the bottom wall of the inner box and laser welding the side walls of the inner box to one another. In some embodiments, laser welding the side walls of the inner box to the bottom wall of the inner box and laser welding the side walls of the inner box to one another creates a plurality of welded seams; and providing the inner box comprises treating the welded seams a combination of hydrofluoric acid and nitric acid.

In one embodiment, in accordance with the principles of the present disclosure, a thermocarrier box comprises an outer shell having a bottom wall and four side walls each extending from the bottom wall. A first vacuum insulated panel is coupled to the bottom wall. A plurality of second vacuum insulated panels are each coupled to one of the side walls. An inner box comprises a bottom wall and four side walls each extending from the bottom wall of the inner box. The bottom wall of the inner box and the side walls of the inner box are each made from a first material and outer surfaces of the bottom wall of the inner box and the side walls of the inner box are each coated with a second material. The inner box is positioned within the outer shell such that the bottom wall of the inner box is coupled to the first vacuum insulated panel and the side walls of the inner box are each coupled to one of the second vacuum insulated panels. A third vacuum insulated panel is positioned over the inner box such that the third vacuum insulated panel engages the side walls of the inner box. A lid is positioned over the third vacuum insulated panel such that the third vacuum insulated panel is positioned between the lid and the inner box. The first material is stainless steel and the second material is a thermal paint. The first material has a thickness of about two inches. The second material has a thickness of about 1.5 mm. The second material includes a first layer and a second layer. The first layers each directly engage the outer surfaces of the bottom wall of the inner box and the side walls of the inner box and are thicker than the second layers. The outer shell is made from expanded polypropylene having a density of about 15 grams per liter. The vacuum insulated panels are each about 30 mm thick. The lid includes an upper section and a lower section. The upper and lower sections are made from expanded polypropylene. The upper and lower sections each have an interior cavity configured for disposal of the third vacuum insulated panel. The upper and lower sections are bonded together to encapsulate the third vacuum insulated panel within.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
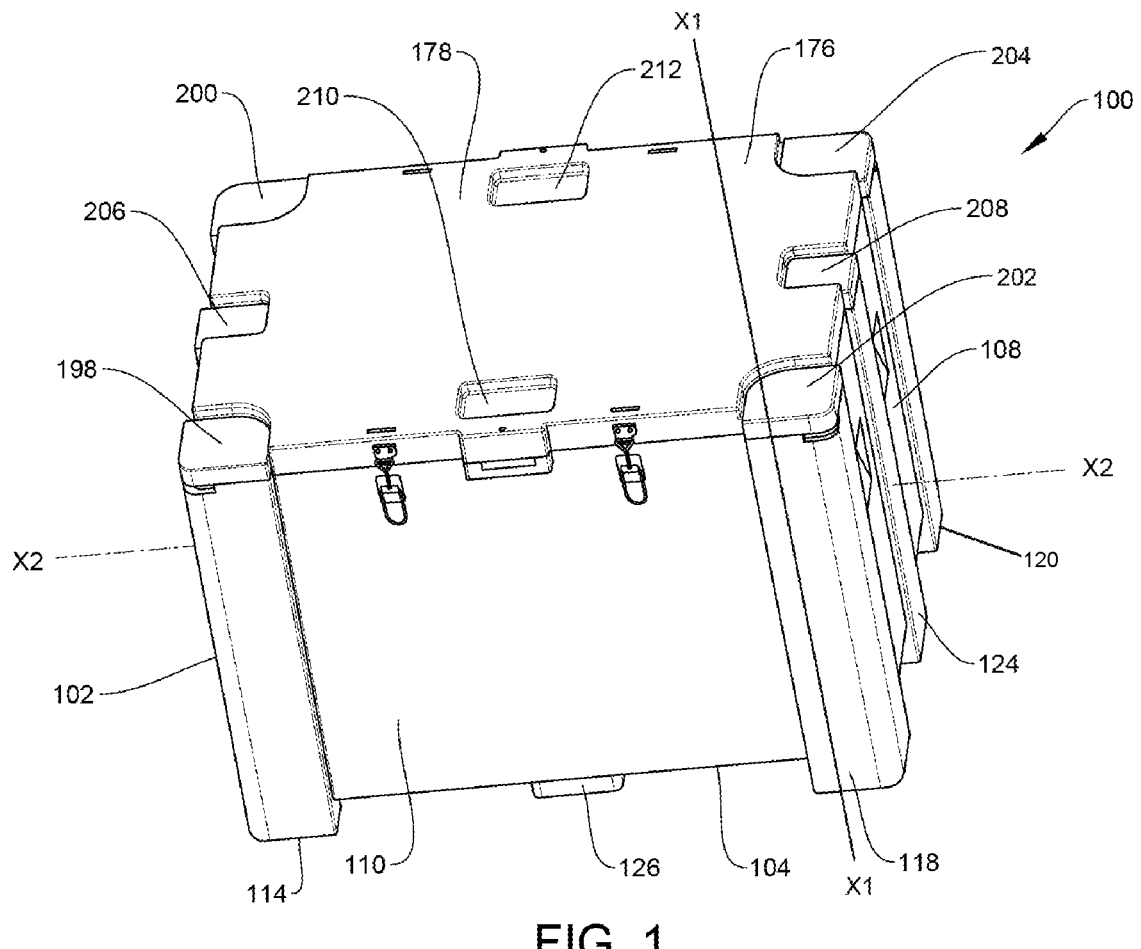
FIG. 1 is a front, perspective view of one embodiment of a thermocarrier box, in accordance with the principles of the present disclosure.

The present disclosure may be understood more readily by reference to the following detailed description of the disclosure taken in connection with the accompanying drawing figures, which form a part of this disclosure. It is to be understood that this disclosure is not limited to the specific devices, conditions or parameters described and/or shown herein, and that the terminology used herein is for the purpose of describing particular embodiments by way of example only and is not intended to be limiting of the claimed disclosure.

The present disclosure is directed to an insulated container, such as, for example a thermocarrier that includes an outer shell, a stainless steel inner box, a plurality of vacuum insulated panels (VIPs) and a lid. The stainless steel inner box is positioned in the outer shell and the VIPs are positioned between the stainless steel inner box and the outer shell and between the lid and the stainless steel inner box. The VIPs may be positioned such that there is no space between the VIPs and the stainless steel inner box and/or between the VIPs and the outer shell. The stainless steel inner box can include an insulated coating that together with the construction of the outer shell, the stainless steel inner box, the VIPs and the lid functions to improve the ability of the thermocarrier to provide the ability to maintain the temperature within the thermocarrier at a suitable level for temperature-sensitive items for periods of time sufficient to allow the items to be shipped to their destination, as discussed in greater detail hereinbelow.

The present disclosure is also directed to a unique method of assembling the thermocarrier that ensures a robust and efficient construction to provide superior insulation and durability. In particular, the method can include production of the outer shell wherein the outer shell is manufactured using expanded polypropylene (EPP) with a density of 15. The EPP material can be chosen from three variations: plain black, antibacterial, or antiflammable. The method can further include production of the stainless steel inner box. For example, the stainless steel inner box can be constructed using 2 mm thick stainless steel on all sides. The production of the stainless steel inner box can employ a laser welding robot for precise and durable welding of components of the stainless steel inner box. The production of the stainless steel inner box can include treating welded seams of the stainless steel inner box with a combination of hydrofluoric acid and nitric acid to ensure thorough post-weld cleaning. Following treatment of the welded seams, the insulated coating may be applied to the stainless steel inner box. Application of the insulated coating may include applying two layers of the insulated coating to the stainless steel inner box. The two layers can have a combined thickness of about 1.5 mm. The two layers can include a first layer and a second layer wherein the first layer is thicker than the second layer. The method can further include production of the VIPs. For example, production of the VIPs can include producing six vacuum insulated panels measuring 30 mm thick for placement between the stainless steel inner box and the outer shell. The production of the lid can include producing an upper section of the lid and a lower section of the lid as two distinct parts. The upper section and the lower section can each include an interior cavity designed to house one of the VIPs. The upper section and the lower section can bonded together, encapsulated one of the VIPs within.

Following production of the outer shell, the inner stainless steel box, the VIPs and the lid, the thermocarrier can be assembled. Assembly of the thermocarrier can include inverting the stainless steel inner box such that the stainless steel inner box is upside down. Four of the VIPs are coupled to the sides of the stainless steel inner box and one of the VIPs is coupled to the bottom of the stainless steel inner box. Coupling of the VIPs to the stainless steel inner box can include lightly adhering the VIPs to the insulated coating on the stainless steel inner box. After the five VIPs are coupled to the stainless steel inner box, the outer shell is positioned over the stainless steel inner box having the five VIPs coupled thereto. The outer shell is then inverted and the lid is attached to the outer shell such that the lid is secured in place with one of the VIPs enclosed/encapsulated within the lid.

As used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a bedding system in accordance with the principles of the present disclosure. Alternate embodiments are also disclosed. Reference will now be made in detail to the exemplary embodiments of the present disclosure, which are illustrated in the accompanying figures. Turning to FIGS. 1-13, there are illustrated components of an insulated container, such as, for example, a thermocarrier 100, in accordance with the principles of the present disclosure.

Figure 2:
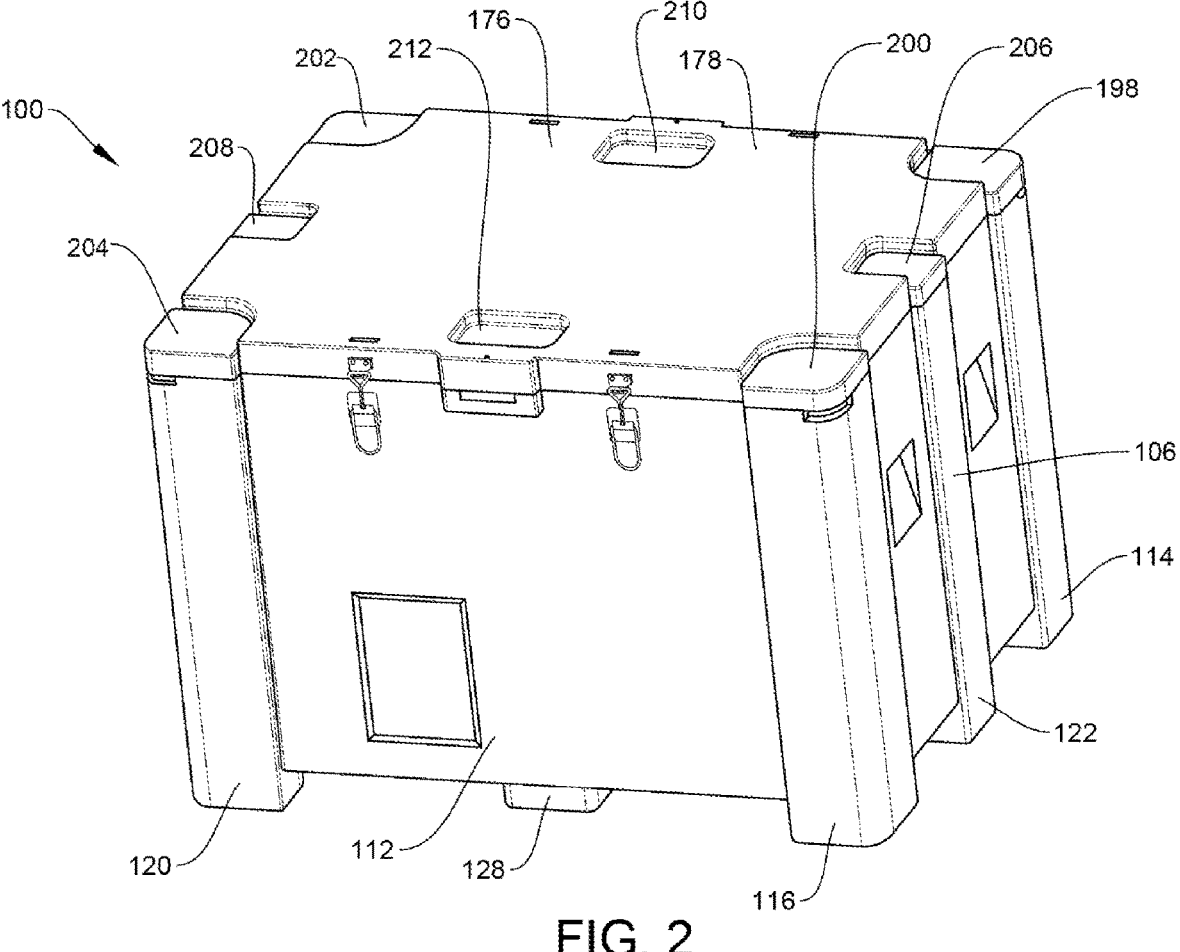
FIG. 2 is a rear, perspective view of the thermocarrier box shown in FIG. 1.
Figure 3:
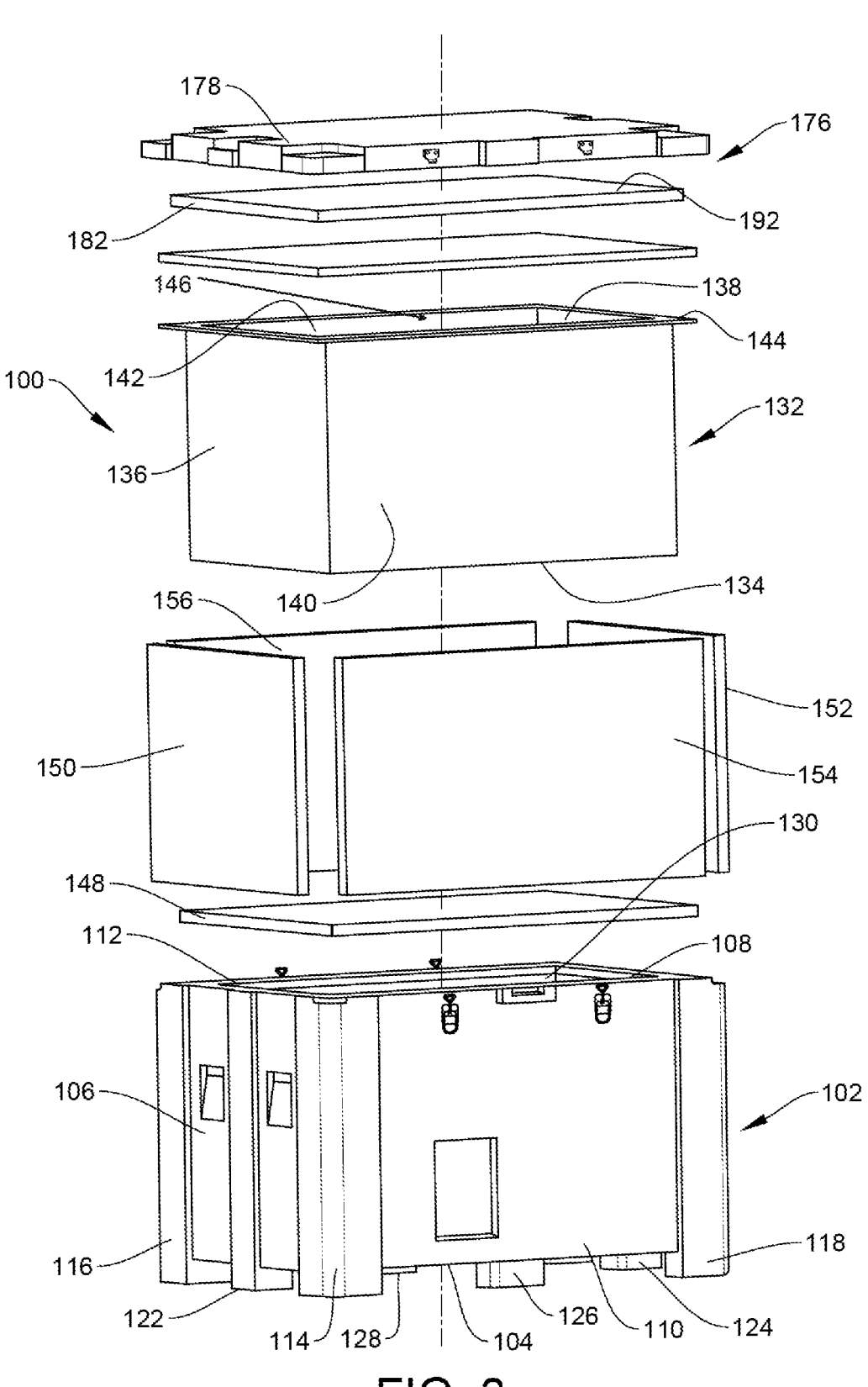
FIG. 3 is an exploded, perspective view of components of the thermocarrier box shown in FIG. 1.
Figure 4:
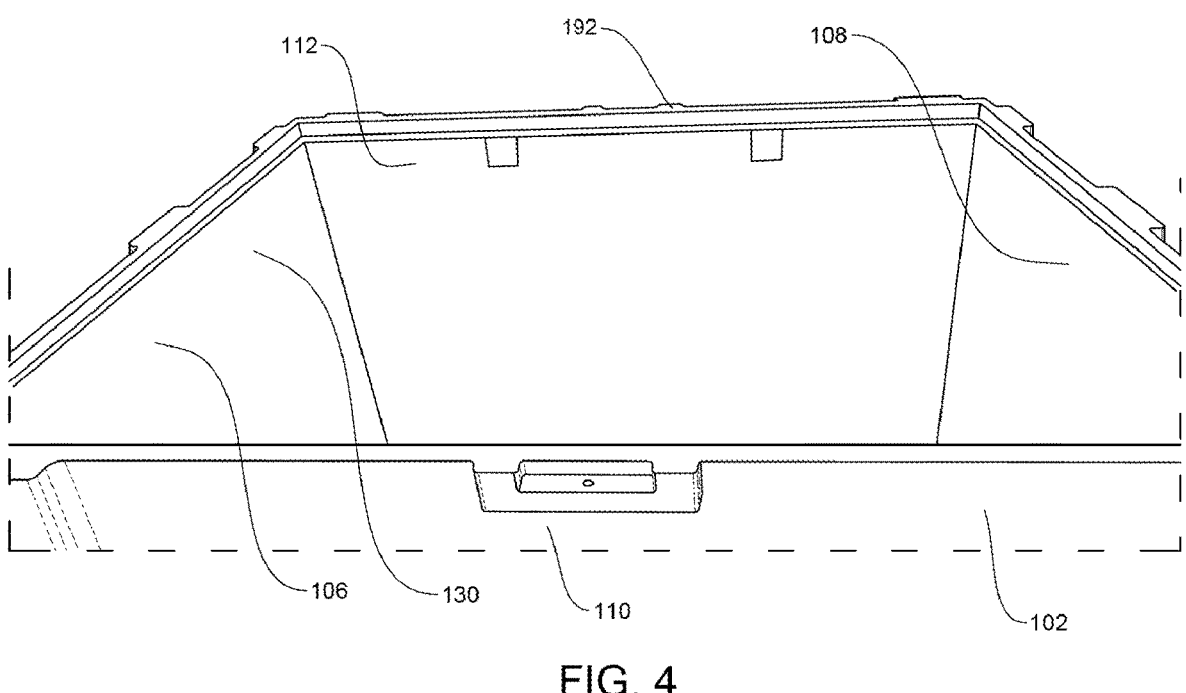
FIG. 4 is a perspective view of a portion of a component of the thermocarrier box shown in FIG. 1.

Thermocarrier 100 includes an outer shell 102 having a bottom wall 104. As shown in FIGS. 1-3, opposite first and second side walls 106, 108 each extend vertically from bottom wall 104. Side walls 106, 108 extend parallel to one another along a longitudinal axis X1. Outer shell 102 includes opposite third and fourth side walls 110, 112 each extending vertically from bottom wall 104. Side walls 110, 112 each extend from side wall 106 to side wall 108. Side walls 110, 112 extend parallel to one another along a longitudinal axis X2. Outer shell 102 can be made from expanded polypropylene (EPP). The EPP that outer shell 102 is made from can be plain black EPP, antibacterial EPP, or antiflammable EPP. In some embodiments, the EPP that outer shell 102 is made from can have a density between about 5 grams per liter (g/L) and about 25 g/L. In some embodiments, the EPP that outer shell 102 is made from can have a density between about 10 g/L and about 20 g/L. In some embodiments, the EPP that outer shell 102 is made from can have a density between about 12.5 g/L and about 17.5 g/L. In some embodiments, the EPP that outer shell 102 is made from can have a density of about 15 g/L. In one particular embodiment, the EPP that outer shell 102 is made from can have a density of 15 g/L. In some embodiments, longitudinal axis X2 extends perpendicular to longitudinal axis X1.

Outer shell 102 can include one or a plurality of legs extending from bottom wall 104 configured to space bottom wall 104 apart from a floor or other surface and to accommodate stacking of thermocarrier 100 with another thermocarrier that is the same or similar to thermocarrier 100, as discussed herein. In particular, an interface between side walls 106, 110 includes a leg 114 extending distally from bottom wall 104; an interface between side walls 106, 112 includes a leg 116 extending distally from bottom wall 104; an interface between side walls 108, 110 includes a leg 118 extending distally from bottom wall 104; and an interface between side walls 108, 112 includes a leg 120 extending distally from bottom wall 104. Leg 114 is aligned and/or coaxial with leg 116 along longitudinal axis X1 and leg 118 is aligned and/or coaxial with leg 120 along longitudinal axis X1. Leg 114 is aligned and/or coaxial with leg 118 along longitudinal axis X2 and leg 116 is aligned and/or coaxial with leg 120 along longitudinal axis X2. Legs 114, 116, 118, 120 are configured for positioning in recesses in a lid of another thermocarrier to stack thermocarrier 100 on top of the other thermocarrier, as discussed herein.

In some embodiments, outer shell 102 can further include one or a plurality of extensions extending from bottom wall 104 to further accommodate stacking of thermocarrier 100 with another thermocarrier that is the same or similar to thermocarrier 100. For example, outer shell 102 can include an extension 122 positioned between legs 114, 116 such that extension 122 is aligned and/or coaxial with legs 114, 116 along longitudinal axis X1 and an extension 124 positioned between legs 118, 120 such that extension 124 is aligned and/or coaxial with legs 118, 120 along longitudinal axis X1. In some embodiments, extension 122 is positioned equidistant between legs 114, 116 and extension 124 is positioned equidistant between legs 118, 120 such that extension 124 is aligned and/or coaxial with extension 122 along longitudinal axis X2. Extensions 122, 124 are configured for positioning in indentations in a lid of another thermocarrier to stack thermocarrier 100 on top of the other thermocarrier, as discussed herein.

In some embodiments, outer shell 102 can further include one or a plurality of supports extending from bottom wall 104 to further accommodate stacking of thermocarrier 100 with another thermocarrier that is the same or similar to thermocarrier 100. For example, outer shell 102 can include a support 126 positioned between legs 114, 118 such that support 126 is offset from legs 114, 118 along longitudinal axis X2 and a support 128 positioned between legs 116, 120 such that support 128 is offset from legs 116, 120 along longitudinal axis X2. In some embodiments, support 126 is positioned equidistant between legs 114, 118 and support 128 is positioned equidistant between legs 116, 120 such that support 128 is aligned and/or coaxial with support 128 along longitudinal axis X1. Supports 126, 128 are configured for positioning in cavities in a lid of another thermocarrier to stack thermocarrier 100 on top of the other thermocarrier, as discussed herein.

Figure 5:
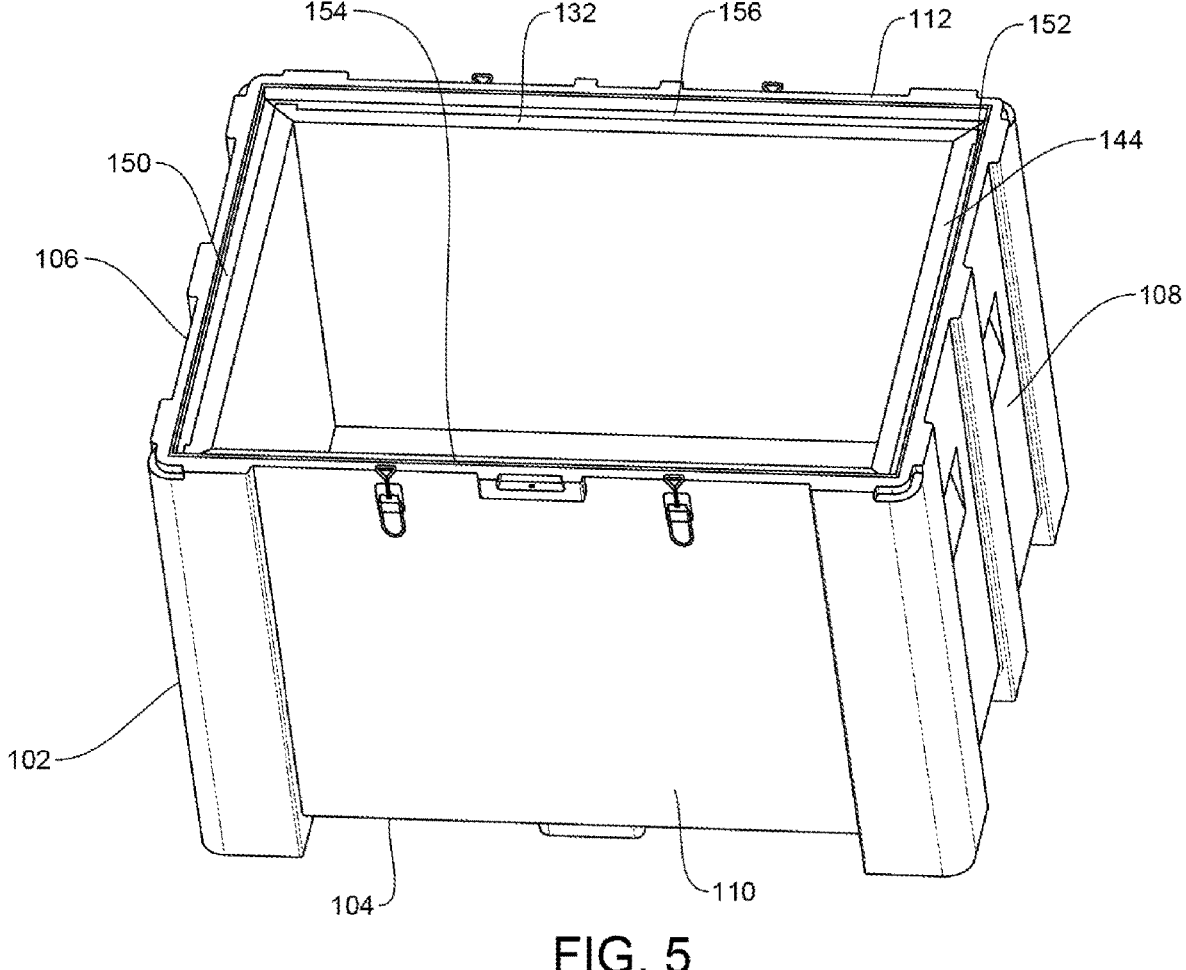
FIG. 5 is a perspective view of components of the thermocarrier box shown in FIG. 1.
Figure 6:
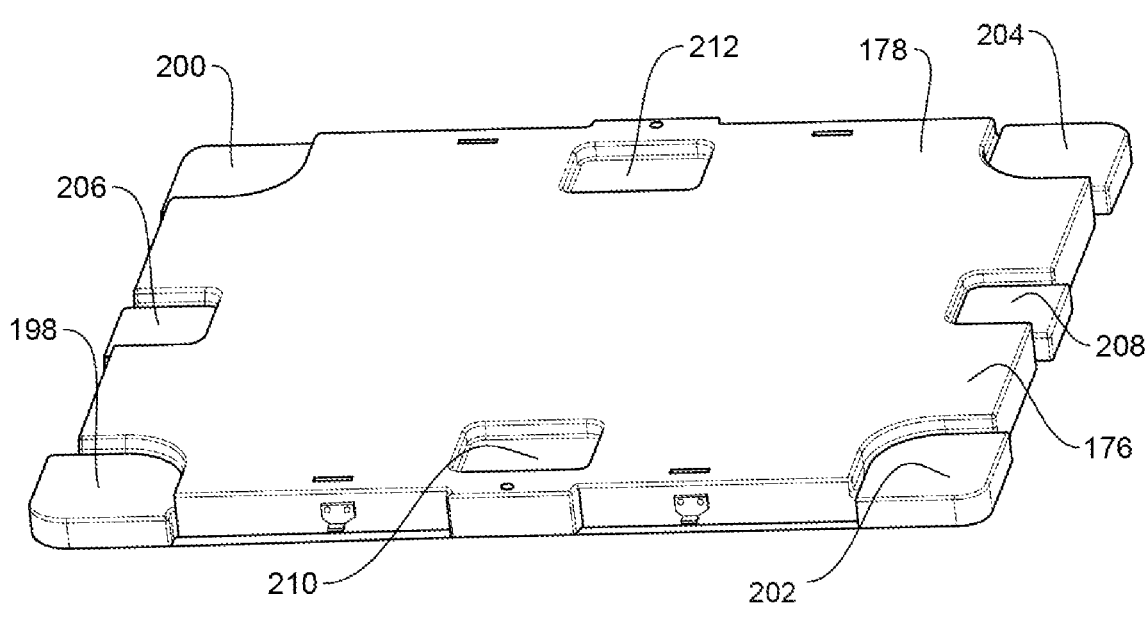
FIG. 6 is a top, perspective view of a component of the thermocarrier box shown in FIG. 1.

A proximal surface of bottom wall 104 of outer shell 102 and inner surfaces of side walls 106, 108, 110, 112 of outer shell 102 define a cavity 130 configured for disposal of an inner box 132 of thermocarrier 100 therein. Inner box 132 includes a bottom wall 134. As shown in FIG. 3, opposite first and second side walls 136, 138 each extend vertically from bottom wall 134. Side walls 136, 138 extend parallel to one another along longitudinal axis X1. Inner box 132 includes opposite third and fourth side walls 140, 142 each extending vertically from bottom wall 134. Side walls 140, 142 each extend from side wall 136 to side wall 138. Side walls 140, 142 extend parallel to one another along longitudinal axis X2. Proximal surfaces of side walls 136, 138, 140, 142 define a circumferential flange 144 of inner box 132. Inner box 132 is disposed in outer shell 102 such that flange 144 is positioned between side walls 106, 108, 110, 112, as shown in FIG. 5.

In some embodiments, inner box 132 is made from metal, such as, for example, stainless steel in order to provide insulation for a cooling agent, such as, for example, dry ice. As would be appreciated by one of ordinary skill in the art, inner box 132 may have a thickness sufficient to ensure proper insulation of dry ice. In particular, bottom wall 134, side wall 136, side wall 138, side wall 140, side wall 142 and/or flange 144 can have a thickness of between about 1 mm and about 3 mm to ensure proper insulation of dry ice. In some embodiments, bottom wall 134, side wall 136, side wall 138, side wall 140, side wall 142 and/or flange 144 can have a thickness of between about 2 mm. In some embodiments, bottom wall, side wall 136, side wall 138, side wall 140, side wall 142 and/or flange 144 can have a thickness of exactly 2 mm. A proximal surface of bottom wall 134 and inner surfaces of side wall 136, side wall 138, side wall 140 and side wall 142 define a cavity 146 configured for disposal of a cooling agent, such as, for example, dry ice and one or more temperature-sensitive items.

While constructing inner box 132 out of metal, such as, for example, stainless steel, can improve the insulating properties of thermocarrier 100 versus thermocarriers having an inner box that is made out of non-metallic materials, such as, for example, it has been found that even constructing inner box 132 out of metal, such as, for example, stainless steel, is insufficient to store and/or ship temperature-sensitive items for more than a short time. Accordingly, inner box 132 is made of stainless steel and is coated with an insulated coating to enhance the insulating properties of thermocarrier 100. In particular, inner box 132 includes an insulated coating of a thermal paint that is applied to outer surfaces of bottom wall 134, side wall 136, side wall 138, side wall 140 and side wall 142. That is, bottom wall 134, side wall 136, side wall 138, side wall 140 and side wall 142 are constructed of stainless steel and have one or a plurality of layers of thermal paint applied to the stainless steel. In some embodiments, the thermal paint applied to the stainless steel can include a first layer of thermal paint that is applied directly to the stainless steel and a second layer of thermal paint that is applied over the first layer. In some embodiments, the first layer has a thickness that is different than a thickness of the second layer. For example, the first layer can have a thickness that is greater than a thickness of the second layer.

In some embodiments, the first layer and the second layer have a combined thickness between about 1 mm and about 2 mm. In some embodiments, the first layer and the second layer have a combined thickness of about 1.5 mm. In some embodiments, the first layer and the second layer have a combined thickness of exactly 1.5 mm. In some embodiments, the first layer and the second layer have a combined thickness between about 2 mm and about 5 mm. In some embodiments, the first layer and the second layer have a combined thickness of between about 2.5 mm and 4.5 mm. In some embodiments, the first layer and the second layer have a combined thickness of between about 3.0 mm and 4.0 mm. In some embodiments, the first layer and the second layer have a combined thickness of exactly 3.0 mm. In some embodiments, the first layer and the second layer have a combined thickness of exactly 4.0 mm.

The thermal paint can include an ultra thin thermal insulation coating. The ultra thin thermal insulation coating can include a pure silicon aerogel gel, a special modified acrylic resin, hollow ceramic microbeads, insulating particles, a defoamer, a wetting dispersant, water and additives.

Thermocarrier 100 includes a plurality of vacuum insulated panels positioned between outer shell 102 and inner box 132. In particular, thermocarrier includes a first vacuum insulated panel 148 positioned between bottom wall 104 of outer shell 102 and bottom wall 134 of inner box 132. Thermocarrier 100 includes a second vacuum insulated panel 150 positioned between side wall 106 of outer shell 102 and side wall 136 of inner box 132. Thermocarrier 100 includes a third vacuum insulated panel 152 positioned between side wall 108 of outer shell 102 and side wall 138 of inner box 132. Thermocarrier 100 includes a fourth vacuum insulated panel 154 positioned between side wall 110 of outer shell 102 and side wall 140 of inner box 132. Thermocarrier 100 includes a fifth vacuum insulated panel 156 positioned between side wall 112 of outer shell 102 and side wall 142 of inner box 132. In some embodiments, a proximalmost surfaces of inner box 132 and a proximalmost surface of at least one of first vacuum insulated panel 148, second vacuum insulated panel 150, third vacuum insulated panel 152 and fourth vacuum insulated panel 154 are recessed inwardly from a proximalmost surface of outer shell 102.

In some embodiments, vacuum insulated panel 148 is positioned between bottom wall 104 of outer shell 102 and bottom wall 134 of inner box 132 such that a first side of vacuum insulated panel 148 directly engages bottom wall 104 and an opposite second side of vacuum insulated panel 148 directly engages bottom wall 134. That is, there is no gap or space between the first side of vacuum insulated panel 148 and bottom wall 104 or between the second side of vacuum insulated panel 148 and bottom wall 134. In some embodiments, vacuum insulated panel 150 is positioned between side wall 106 of outer shell 102 and side wall 136 of inner box 132 such that a first side of vacuum insulated panel 150 directly engages side wall 106 and an opposite second side of vacuum insulated panel 150 directly engages side wall 136. That is, there is no gap or space between the first side of vacuum insulated panel 150 and side wall 106 or between the second side of vacuum insulated panel 150 and side wall 136. In some embodiments, vacuum insulated panel 152 is positioned between side wall 108 and side wall 138 such that a first side of vacuum insulated panel 152 directly engages side wall 108 and an opposite second side of vacuum insulated panel 152 directly engages side wall 138. That is, there is no gap or space between the first side of vacuum insulated panel 152 and side wall 108 or between the second side of vacuum insulated panel 152 and side wall 138. In some embodiments, vacuum insulated panel 154 is positioned between side wall 110 and side wall 140 such that a first side of vacuum insulated panel 154 directly engages side wall 110 and an opposite second side of vacuum insulated panel 154 directly engages side wall 140. That is, there is no gap or space between the first side of vacuum insulated panel 154 and side wall 110 or between the second side of vacuum insulated panel 154 and side wall 140. In some embodiments, vacuum insulated panel 156 is positioned between side wall 112 and side wall 142 such that a first side of vacuum insulated panel 156 directly engages side wall 112 and an opposite second side of vacuum insulated panel 156 directly engages side wall 142. That is, there is no gap or space between the first side of vacuum insulated panel 156 and side wall 112 or between the second side of vacuum insulated panel 156 and side wall 142.

It is envisioned that vacuum insulated panels 148, 150, 152, 154, 156 can include various types of vacuum insulated panels. For example, in one embodiment, shown in FIG. 10, one or more of vacuum insulated panels 148, 150, 152, 154, 156 can include a core 158 that is enclosed within a plastic covering 160. Core 158 can include porous material such as, for example, fused silica, glass fiber, aerogel, etc. A vacuum may be applied inside of covering 160 before covering 160 is sealed to reduce pressure within covering 160. In one embodiment, shown in FIG. 11, one or more of vacuum insulated panels 148, 150, 152, 154, 156 can include a core 162 that is enclosed within a plastic covering 164. Core 162 can include porous material such as, for example, fused silica, glass fiber, aerogel, etc. A metal foil 166 is positioned between core 162 and covering 164. A vacuum may be applied inside of covering 164 before covering 164 is sealed to reduce pressure within covering 164. In one embodiment, shown in FIG. 12, one or more of vacuum insulated panels 148, 150, 152, 154, 156 can include a core 168 that is enclosed within a plastic covering 170. Core 168 can include porous material such as, for example, fused silica, glass fiber, aerogel, etc. A first layer of metal foil 172 and a second layer of metal foil 174 are positioned between core 168 and covering 170. A vacuum may be applied inside of covering 170 before covering 170 is sealed to reduce pressure within covering 170.

Figure 7:
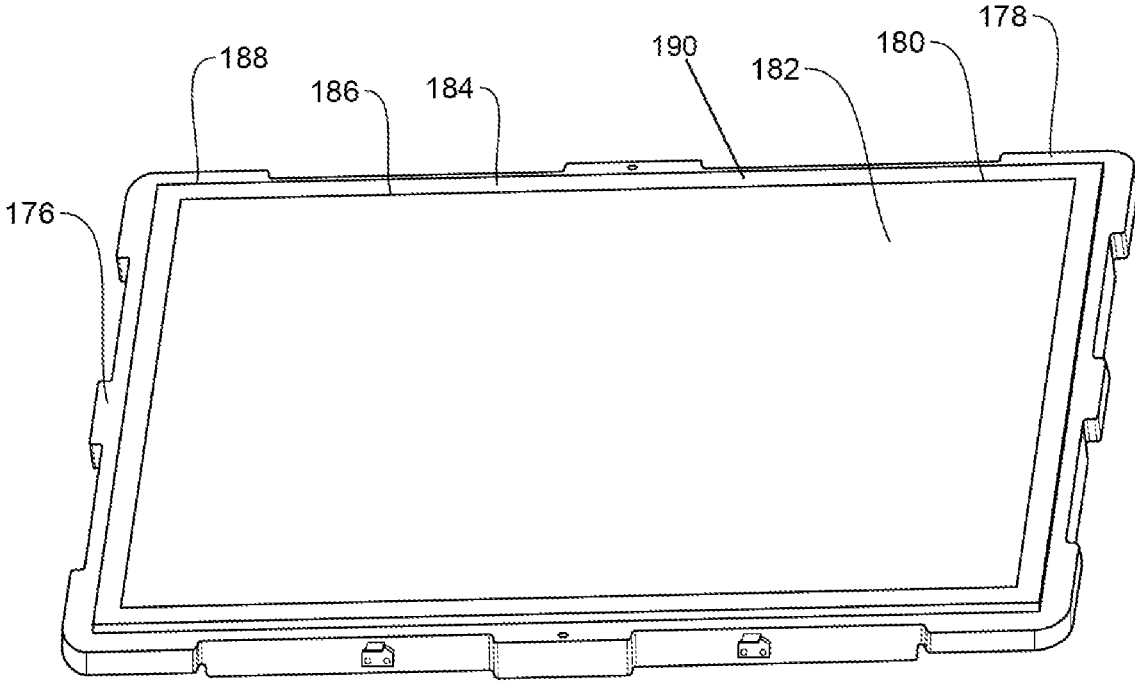
FIG. 7 is a bottom, perspective view of the component shown in FIG. 6.
Figure 8:
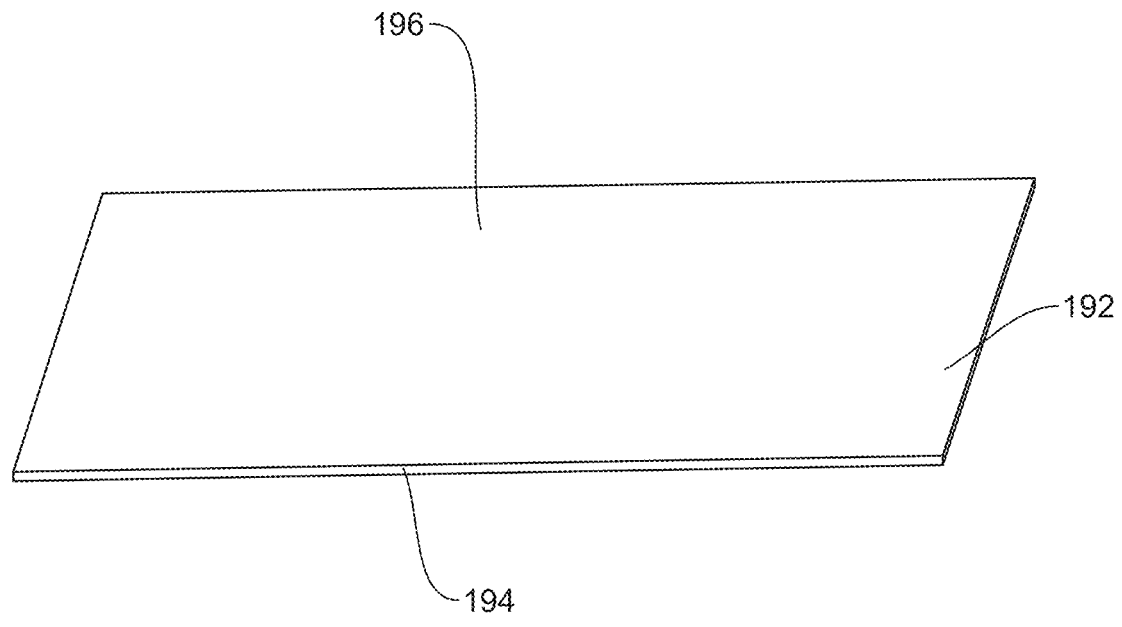
FIG. 8 is a perspective view of a component of the thermocarrier box shown in FIG. 1.

Thermocarrier 100 includes a cover, such as, for example, a lid 176 that covers cavity 130 of outer shell 102 and cavity 146 of inner box 132. Lid 176 includes an upper section 178 that defines an interior cavity 180. A lower section 182 of lid 176 is positioned in interior cavity 180, as shown in FIG. 7. Upper section 178 and/or lower section 182 may be made from one or more of the materials discussed herein, such as, for example, expanded polypropylene. Upper section 178 includes a perimeter wall 184 having an inner surface 186 that defines interior cavity 180. Wall 184 includes an opposite outer surface 188 that is configured to directly engage inner surfaces of side walls 106, 108, 110, 112 when lid 176 is coupled to outer shell 102.

Figure 9:
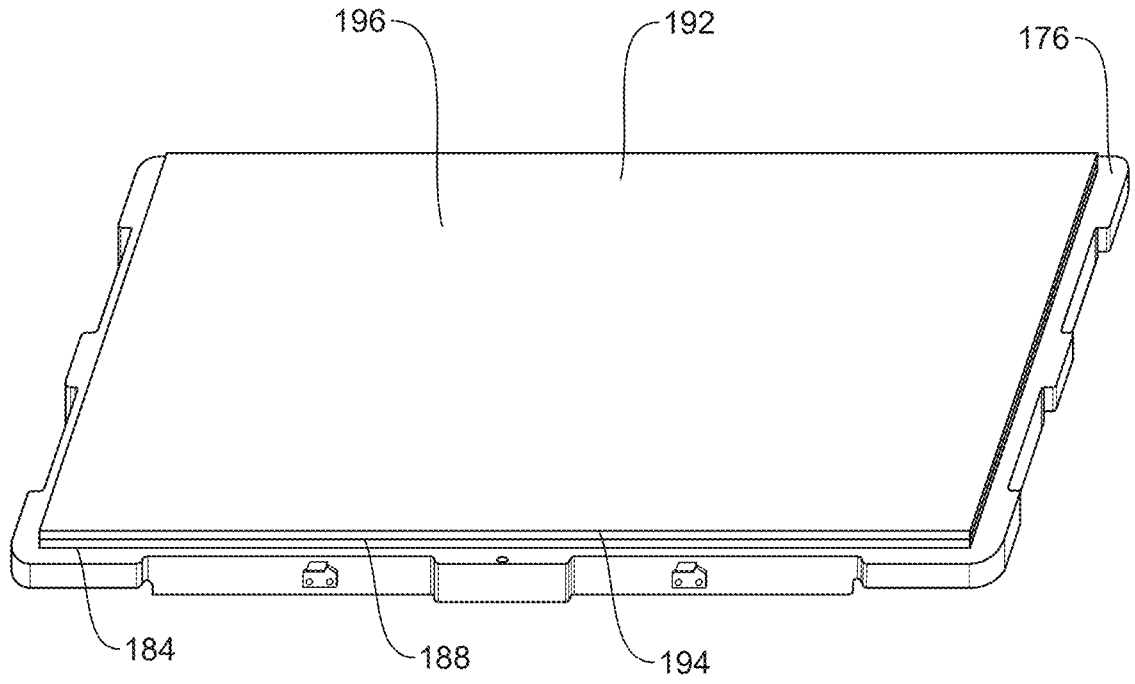
FIG. 9 is a bottom, perspective view of the component shown in FIG. 8 coupled to the component shown in FIG. 6.
Figure 10:
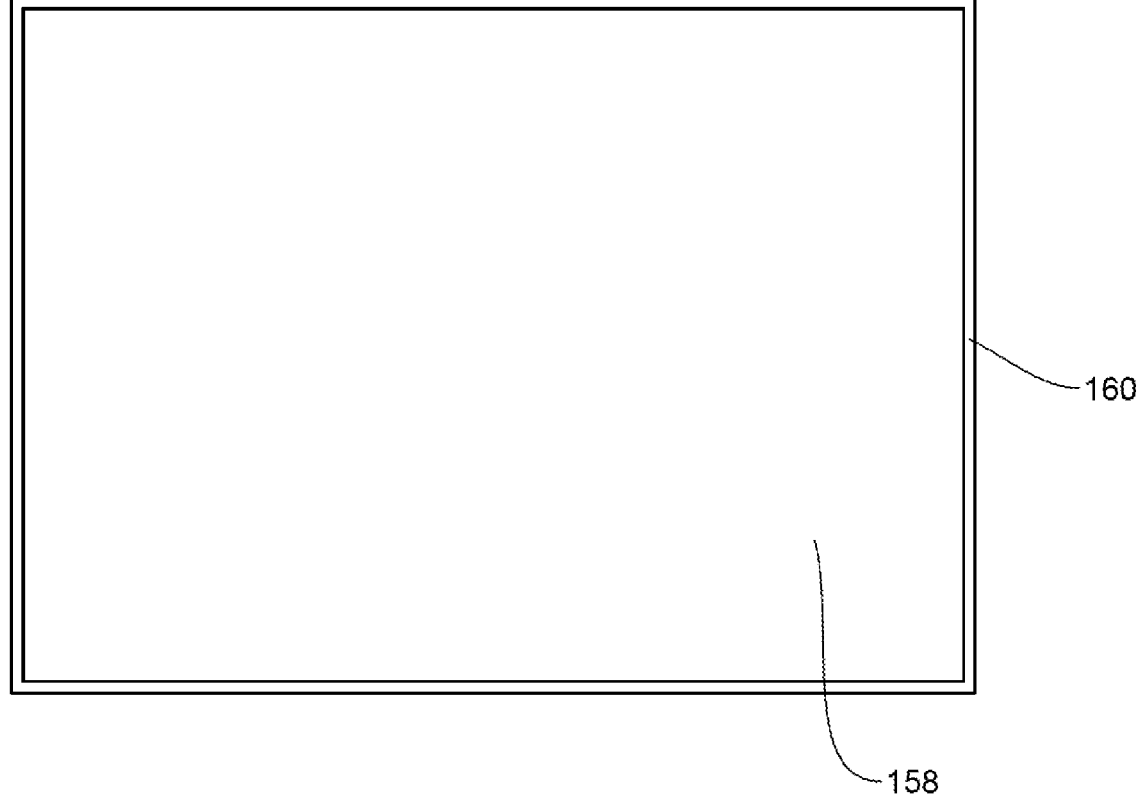
FIG. 10 is a cross-sectional view of a one embodiment of a component of the thermocarrier box shown in FIG. 1, in accordance with the principles of the present disclosure.
Figure 11:
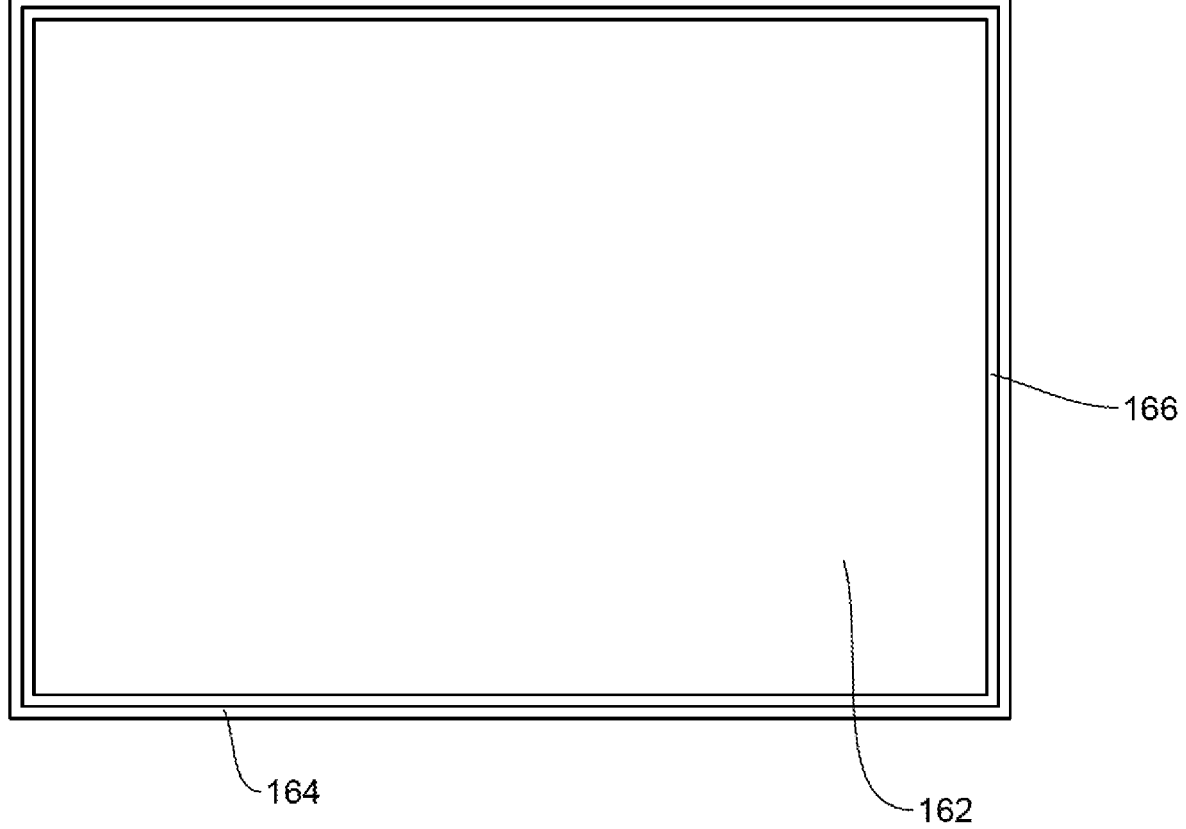
FIG. 11 is a cross-sectional view of a one embodiment of a component of the thermocarrier box shown in FIG. 1, in accordance with the principles of the present disclosure.
Figure 12:
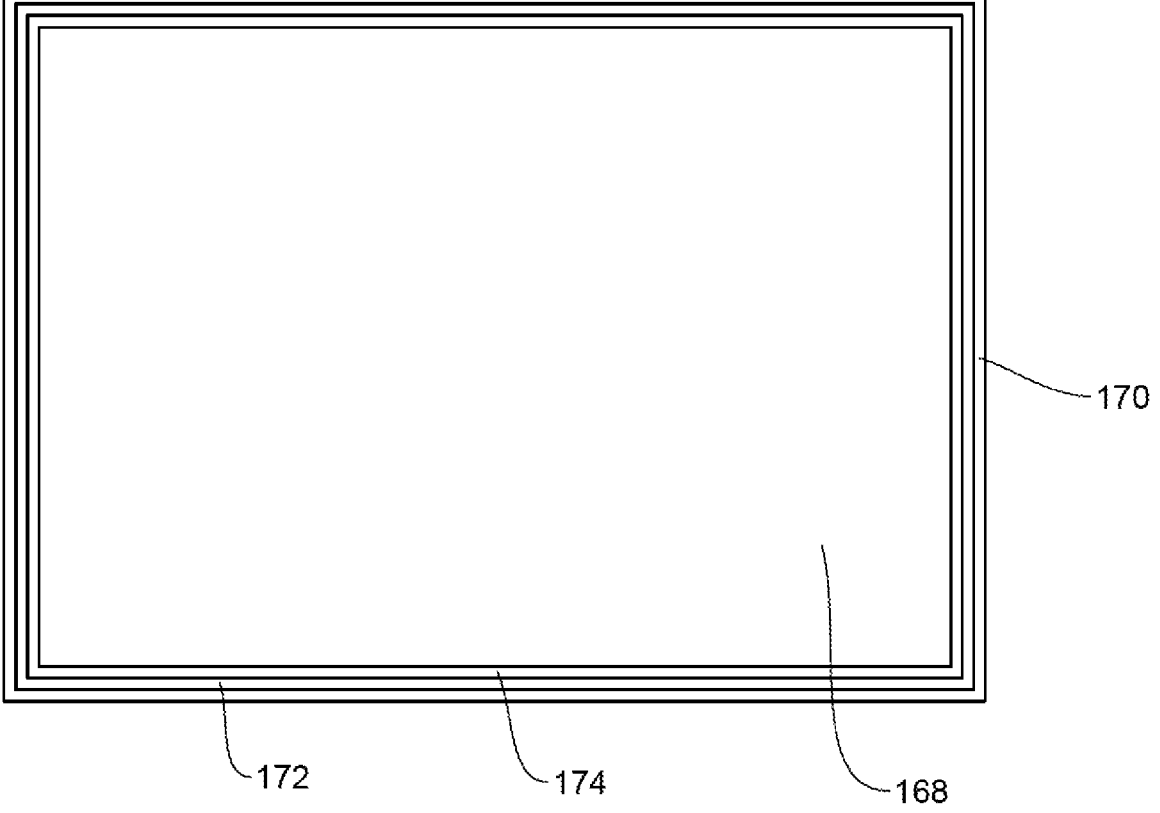
FIG. 12 is a cross-sectional view of a one embodiment of a component of the thermocarrier box shown in FIG. 1, in accordance with the principles of the present disclosure.

Thermocarrier 100 includes a sixth vacuum insulated panel 192 (FIG. 8) that is coupled to lid 176 such that vacuum insulated panel 192 covers lower section 182, as shown in FIG. 9. It is envisioned that vacuum insulated panel 192 can be the same as or similar to one or more of vacuum insulated panels 148, 150, 152, 154, 156, such as, for example, the embodiment of the vacuum insulated panel shown in FIG. 10, the embodiment of the vacuum insulated panel shown in FIG. 11 and/or the embodiment of the vacuum insulated panel shown in FIG. 12. Vacuum insulated panel 192 directly engages a top surface of wall 184 and can have a size that is equal to an area defined by outer surface 188 of wall 184 such that an outer surface 194 of vacuum insulated panel 192 is flush with outer surface 188 of wall 184, as shown in FIG. 9. Vacuum insulated panel 192 is coupled to lid 176 such that outer surface 194 of vacuum insulated panel 192 directly engages inner surfaces of side walls 106, 108, 110, 112 when lid 176 is coupled to outer shell 102. In some embodiments, a bottom surface 196 of vacuum insulated panel 192 is configured to directly engage top surfaces of side walls 136, 138, 140, 142 and/or top surfaces of vacuum insulated panels 150, 152, 154, 156 when lid 176 is coupled to outer shell 102 such that inner surfaces of side walls 106, 108, 110, 112 directly engage outer surface 194 of vacuum insulated panel 192.

In some embodiments, lid 176 can include one or a plurality of features to accommodate stacking of thermocarrier 100 with another thermocarrier that is the same or similar to thermocarrier 100. In particular, lid 176 can include a first indentation 198 configured for disposal of a leg 114 of another thermocarrier, a second indentation 200 configured for disposal of a leg 116 of the other thermocarrier, a third indentation 202 configured for disposal of a leg 118 of the other thermocarrier, and a fourth indentation 204 configured for disposal of a leg 120 of the other thermocarrier. Indentations 198, 200, 202, 204 each have a size and shape that corresponds to a size and shape of one of legs 114, 116, 118, 120 in a manner that prevents relative movement between the other thermocarrier and lid 176 when the other thermocarrier is stacked with thermocarrier 100.

In some embodiments, lid 176 can include one or a plurality of recesses to further accommodate stacking of thermocarrier 100 with another thermocarrier that is the same or similar to thermocarrier 100. In particular, lid 176 can include a first recess 206 configured for disposal of an extension 122 of the other thermocarrier and a second recess 208 configured for disposal of an extension 124 of the other thermocarrier. Recesses 206, 208 each have a size and shape that corresponds to a size and shape of one of extensions 122, 124 in a manner that prevents relative movement between the other thermocarrier and lid 176 when the other thermocarrier is stacked with thermocarrier 100.

In some embodiments, lid 176 can include one or a plurality of depressions to further accommodate stacking of thermocarrier 100 with another thermocarrier that is the same or similar to thermocarrier 100. In particular, lid 176 can include a first depression 210 configured for disposal of a support 126 of the other thermocarrier and a second depression 212 configured for disposal of a support 128 of the other thermocarrier. Depressions 210, 212 each have a size and shape that corresponds to a size and shape of one of supports 126, 128 in a manner that prevents relative movement between the other thermocarrier and lid 176 when the other thermocarrier is stacked with thermocarrier 100.

Figure 13:
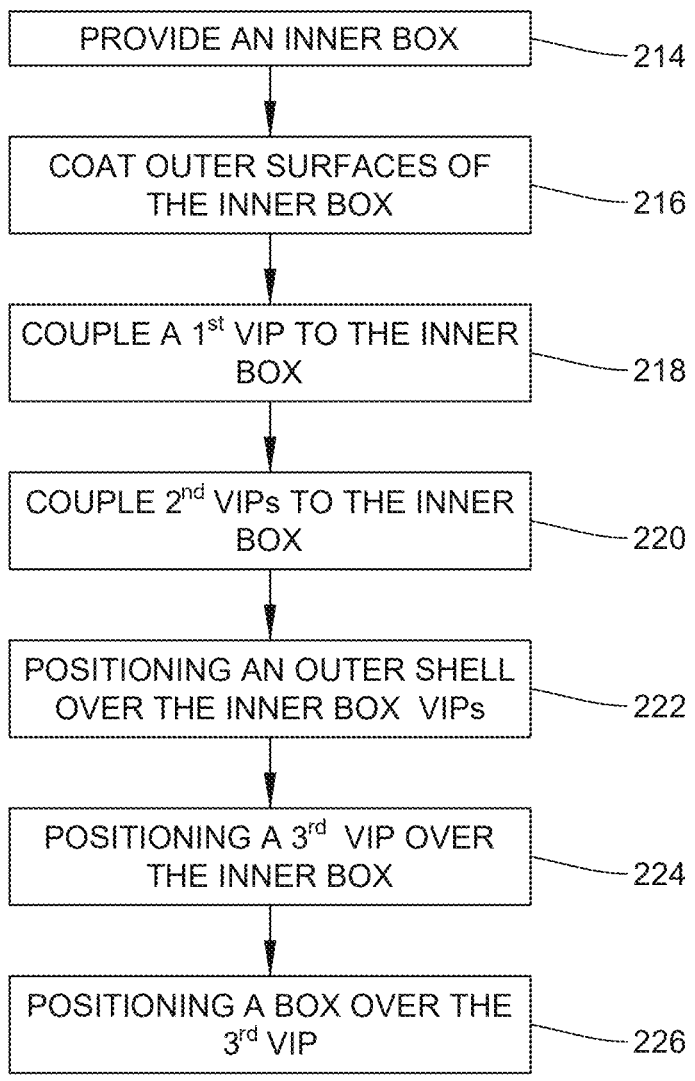
FIG. 13 is a flow chart showing one embodiment of a method of assembling the thermocarrier box shown in FIG. 1.

In assembly, operation and use, a method for assembling thermocarrier 100 includes a step 214 in which inner box 132 is provided, as shown in FIG. 13. In particular, step 214 includes assembling inner box 132 by coupling side walls 136, 138, 140, 142 to bottom wall 134 and/or one another by welding, for example. In some embodiments, the assembly of inner box 132 includes welding side walls 136, 138, 140, 142 to bottom wall 134 and/or one another to create a plurality of welded seams, such as, for example, a welded seam between side wall 136 and bottom wall 134, a welded seam between side wall 138 and bottom wall, a welded seam between side wall 140 and bottom wall 134, a welded seam between side wall 142 and bottom wall 134, a welded seam between side wall 106 and side wall 110, a welded seam between side wall 106 and side wall 112, a welded seam between side wall 108 and side wall 110, and a welded seam between side wall 108 and side wall 112. In some embodiments, the welded seams are created by a laser welding robot for precise and durable welding. In some embodiments, the assembly of inner box includes post welding cleaning. Post welding cleaning can include treating the welded seams of inner box 132 with a cleaning material. In some embodiments, the cleaning material can include a combination of hydrofluoric acid and nitric acid.

The method for assembling thermocarrier 100 includes a step 216 in which outer surfaces of inner box 132 are coated with an insulated coating to enhance the insulating properties of thermocarrier 100. In particular, inner box 132 includes an insulated coating of a thermal paint that is applied to outer surfaces of bottom wall 134, side wall 136, side wall 138, side wall 140 and side wall 142. In some embodiments, the thermal paint applied to the stainless steel can include a first layer of thermal paint that is applied directly to the stainless steel and a second layer of thermal paint that is applied over the first layer. In some embodiments, the first layer has a thickness that is different than a thickness of the second layer. For example, the first layer can have a thickness that is greater than a thickness of the second layer. The thermal paint can include an ultra thin thermal insulation coating. The ultra thin thermal insulation coating can include a pure silicon aerogel gel, a special modified acrylic resin, hollow ceramic microbeads, insulating particles, a defoamer, a wetting dispersant, water and additives.

The method for assembling thermocarrier 100 includes a step 218 in which a first vacuum insulated panel, such as, for example, vacuum insulated panel 148 is coupled to bottom wall 134 of inner box 132, as discussed herein, and a step 220 in which second vacuum insulated panels, such as, for example vacuum insulated panels 150, 152, 154, 156 are coupled to side walls 136, 138, 140, 142 of inner box 132, as also discussed herein. In some embodiments, vacuum insulated panels 148, 150, 152, 154, 156 are coupled to inner box 132 after inner box 132 is coated with the thermal paint such that vacuum insulated panels 148, 150, 152, 154, 156 directly engage the thermal paint that was applied to coat the outer surfaces of inner box 132.

Following the coupling of vacuum insulated panels 148, 150, 152, 154, 156 to inner box 132, a step 222 includes positioning outer shell 102 over inner box 132. In some embodiments, positioning outer shell 102 over inner box 132 can include inverting inner box 132 such that top surface of side walls 136, 138, 140, 142 of inner box 132 directly engage a floor or other surface. Outer shell 102 can then be inverted and positioned over inner box 132 such that vacuum insulated panels 150, 152, 154, 156 each directly engage the inner surface of one of side walls 106, 108, 110, 112 of outer shell 102, as discussed herein. Once outer shell 102 is positioned over inner box 132, the assembly of outer shell 102, inner box and vacuum insulated panels 148, 150, 152, 154, 156 can be flipped over such that bottom wall 104 of outer shell directly engages the floor or other surface.

The method for assembling thermocarrier 100 includes a step 224 in which a third vacuum insulated panel, such as, for example, vacuum insulated panel 192 is positioned over inner box 132 such that vacuum insulated panel 192 covers cavity 146 of inner box 132, as discussed herein. In a step 226, lid 176 is positioned over vacuum insulated panel 192 and is removably coupled to outer shell 102. In use, lid 176 can be removed from outer shell 102 and one or a plurality of temperature-sensitive items can be inserted into cavity 146 of inner box 132 for storage and/or transport of the temperature-sensitive item(s). A cooling agent or material, such as, for example, dry ice can also be inserted into cavity 146 of inner box 132 to decrease the temperature within cavity 146. Once the temperature-sensitive item(s) and/or the cooling agent are inserted into cavity 146, lid 176 may be positioned over outer shell 102 and coupled to outer shell 102, as discussed herein, for storage and/or transport of the temperature-sensitive item(s).

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A thermocarrier box, comprising:
    an outer shell comprising a bottom wall and four side walls each extending from the bottom wall;
    a first vacuum insulated panel coupled to the bottom wall;
    a plurality of second vacuum insulated panels that are each coupled to a different one of the side walls;
    an inner box comprising a bottom wall and four side walls each extending from the bottom wall of the inner box, the bottom wall of the inner box and the side walls of the inner box each being made from a first material, outer surfaces of the bottom wall of the inner box and the side walls of the inner box each being coated with a second material, the inner box being positioned within the outer shell such that the bottom wall of the inner box is coupled to the first vacuum insulated panel and the side walls of the inner box are each coupled to a different one of the second vacuum insulated panels and the first and second vacuum insulated panels directly contact the inner box, the inner box being spaced apart from the outer shell;
    a third vacuum insulated panel positioned over the inner box such that the third vacuum insulated panel engages the side walls of the inner box; and
    a lid positioned over the third vacuum insulated panel such that the third vacuum insulated panel is positioned between the lid and the inner box,
    wherein the inner box includes a flange, the flange being spaced apart from the outer shell.

2. The thermocarrier box recited in claim 1, wherein the first material is metal and the second material is a thermal paint.

3. The thermocarrier box recited in claim 1, wherein the first material is stainless steel and the second material is a thermal paint.

4. The thermocarrier box recited in claim 3, wherein the first material has a thickness of about two inches.

5. The thermocarrier box recited in claim 3, wherein the second material has a thickness of about 1.5 mm.

6. The thermocarrier box recited in claim 3, wherein the second material includes a first layer and a second layer.

7. The thermocarrier box recited in claim 6, wherein the first layer directly engages the outer surface of the bottom wall of the inner box and the side walls of the inner box and are thicker than the second layer.

8. The thermocarrier box recited in claim 1, wherein the outer shell is made from expanded polypropylene having a density of about 15 grams per liter.

9. The thermocarrier box recited in claim 1, wherein the outer shell is made from antibacterial expanded polypropylene.

10. The thermocarrier box recited in claim 1, wherein the outer shell is made from antiflammable expanded polypropylene.

11. The thermocarrier box recited in claim 1, wherein the vacuum insulated panels are each about 30 mm thick.

12. The thermocarrier box recited in claim 1, proximalmost surfaces of the inner box and the second vacuum insulated panels are recessed inwardly from a proximalmost surface of the outer shell.

13. A thermocarrier box, comprising:

an outer shell comprising a bottom wall and four side walls each extending from the bottom wall;

a first vacuum insulated panel coupled to the bottom wall;

a plurality of second vacuum insulated panels that are each coupled to a different one of the side walls;

an inner box comprising a bottom wall, four side walls each extending from the bottom wall of the inner box and a flange extending outwardly from the side walls of the inner box, the flange being spaced apart from the outer shell, the bottom wall of the inner box and the side walls of the inner box each being made from a first material, outer surfaces of the bottom wall of the inner box and the side walls of the inner box each being coated with a second material, the inner box being positioned within the outer shell such that the bottom wall of the inner box is coupled to the first vacuum insulated panel and the side walls of the inner box are each coupled to a different one of the second vacuum insulated panels and the first and second vacuum insulated panels directly contact the inner box;

a third vacuum insulated panel positioned over the inner box such that the third vacuum insulated panel engages the side walls of the inner box; and a lid positioned over the third vacuum insulated panel such that the third vacuum insulated panel is positioned between the lid and the inner box.

14. The thermocarrier box recited in claim 13, wherein the flange is spaced apart from the outer shell by the second vacuum insulated panels.

15. The thermocarrier box recited in claim 13, wherein the flange directly engages top surfaces of each of the second vacuum insulated panels.

* * * * *